United States Patent [19]

Smith et al.

[11] Patent Number: 5,418,705

[45] Date of Patent: May 23, 1995

[54] OVERVOLTAGE PROTECTION SYSTEM FOR TELEVISIONS

[75] Inventors: Lawrence E. Smith; Kevin M. Williams, both of Indianapolis, Ind.

[73] Assignee: Thomson Consumer Electronics, Inc., Indianapolis, Ind.

[21] Appl. No.: 309,714

[22] Filed: Aug. 30, 1994

Related U.S. Application Data

[63] Continuation of Ser. No. 986,635, Dec. 1, 1992, abandoned.

[51] Int. Cl.⁶ ............................................. H02H 7/122
[52] U.S. Cl. ......................................... 363/56; 315/411
[58] Field of Search ........................... 363/21, 56, 97; 315/411; 358/243; 361/90, 91, 111

[56] References Cited

U.S. PATENT DOCUMENTS

| | | | |
|---|---|---|---|
| 3,629,644 | 12/1971 | Waybright | 315/22 |
| 3,931,548 | 1/1976 | Barchok | 317/33 VR |
| 4,126,816 | 11/1978 | Willis | 315/411 |
| 4,145,639 | 3/1979 | Willis | 315/411 |
| 4,234,829 | 11/1980 | Willis | 315/411 |
| 4,287,535 | 9/1981 | Vakil | 358/243 |
| 4,335,335 | 6/1982 | Willis | 315/411 |
| 4,827,194 | 5/1989 | Fernsler | 315/371 |
| 4,930,060 | 5/1990 | Leonardi | 363/56 |
| 4,945,463 | 7/1990 | Dangschat | 363/56 |
| 5,047,698 | 9/1991 | Fernsler et al. | 315/411 |
| 5,111,122 | 5/1992 | Wilber | 315/411 |
| 5,119,262 | 6/1992 | Ikeuchi | 363/56 |

*Primary Examiner*—Thomas M. Dougherty
*Assistant Examiner*—Matthew V. Nguyen
*Attorney, Agent, or Firm*—Joseph S. Tripoli; Joseph J. Laks; Harvey D. Fried

[57] ABSTRACT

A first resonant retrace circuit is operable for generating a first voltage signal and a second resonant retrace circuit coupled to the first resonant retrace circuit is operable for generating a second voltage signal summed with the first voltage signal. An auxiliary winding of a flyback transformer in the first resonant retrace circuit generates a first feedback pulse signal representative of the first voltage signal. A regulator senses the summed first and second voltage signals and generates a second feedback pulse signal representative of the summed first and second voltage signals. The second resonant retrace means is responsive to the regulator. A resistive summing junction combines the first and second feedback pulse signals to generate a composite feedback pulse signal. A voltage level is generated indicative of the energy in the composite feedback pulse signal. An overvoltage protection circuit is responsive to the voltage level for disabling operation of at least one of the first and second resonant retrace circuits.

19 Claims, 2 Drawing Sheets

OVERVOLTAGE PROTECTION SYSTEM FOR TELEVISIONS

CROSS REFERENCE TO RELATED APPLICATIONS

This is a continuation of application Ser. No. 07/986,635 filed Dec. 1, 1992, and now abandoned.

BACKGROUND OF THE INVENTION

1. Field of the Invention

This invention relates generally to the field of overvoltage protection systems for television apparatus, and in particular, to an X-radiation protection circuit which enables television apparatus to operate at ultor voltage levels which are closer to the isoexposure curves of cathode ray tubes.

2. Description of Art

It is normally desirable to operate a picture tube at the highest ultor voltage possible, due to concerns with beam spot size and circuit configuration and limitations in general. One of the limitations on how high the ultor voltage can be is the ultor voltage level as which X-radiation is generated. The Center for Devices and Radiological Health, part of the Food and Drug Administration, sets limits on the maximum permissible X-radiation and a cathode ray tube vendor will specify what the ultor voltage versus beam current relationship is for each particular tube is which will result in generation of X-radiation. This relationship is expressed as an isoexposure curve. An isoexposure curve is shown in a graph in FIG. 3. The isoexposure curve represents X-radiation at a level of 0.5 milliRankins per hour (mR/Hr). The Y axis is the ultor, or high voltage level designated HV. The X axis is beam current ($I_{BEAM}$), denoted in milliamps (ma). For the curve shown, a maximum beam current level of approximately 2 ma exceeds the safe level defined by the isoexposure curve at approximately 38 KV. In accordance with the safety rules, a television chassis shall not be allowed to drive a picture tube to any HV vs. $I_{BEAM}$ point which exceeds the isoexposure curve. It is also required that these excessive conditions cannot exist even with only one fault in the chassis. This fault can occur in any circuit, including for example the high voltage circuit, the X-ray protection (XRP) circuit and the power supply; or can result from any component value change.

FIG. 3 also shows two operating curves. The upper curve is designated with tracking high voltage HV and the lower curve is designated without tracking high voltage HV. The lower operating curve represents operation without benefit of the invention taught herein. The upper operating curve represents operation in accordance with the invention taught herein. Normal operation of the chassis would be at HV vs. $I_{BEAM}$ levels below the isoexposure curve. A fourth curve in the graph, between the operating curve(s) and the isoexposure curve is the XRP circuit trip curve, that is, the voltage level at which the XRP circuit disables the television in a manner which prevents generation of X-radiation, for example by shutting down the high voltage power supply.

There are tolerances associated with each of these curves which tend to widen the distance between the operating curve(s) and the isoexposure curve. These tolerances are an inherent aspect of essentially all electrical circuits and components, such as the XRP circuit, the high voltage regulator and the operating characteristics for a particular picture tube. There must be enough separation between the isoexposure curve and the operating curve to avoid X-radiation under worst case circumstances of normal operation. This separation is often referred to as the pad.

Ultor voltage is ordinarily generated in a flyback transformer of a resonant retrace horizontal deflection circuit. Such a circuit might generate 29 KV. Some picture tubes require still higher ultor voltages for proper operation. A second resonant retrace circuit having a second flyback transformer can generate a boost voltage, for example 3 KV. The appropriate windings of the flyback transformers of the two resonant retrace circuits are coupled in series to generate an ultor voltage which is the sum of the two voltages, 32 KV in this example. However, with prior art overvoltage protection systems, in which the high voltage from the second circuit was not tracked, it was necessary to add the maximum boost voltage of the high voltage regulator to the amount that the operating curve must be decreased below the isoexposure and XRP trip curves. Such a limitation made it more difficult to operate safely at ultor voltage levels closer to the isoexposure and XRP trip curves, notwithstanding the boost voltage.

The XRP circuit is a circuit detects the value of the kine ultor (HV) voltage and will shut down the HV power supply if the HV reaches a certain voltage. This voltage is determined by the kine X-radiation characteristics. In one known method of operation, a peak detected voltage from the HV transformer is used to indicate the value of HV. This peak detected voltage is not generated by the same winding as the HV, but is on the same transformer and therefore proportional to the HV. In another known method, a HV regulator is used which regulates by inserting a pulse voltage in series with the HV transformer winding which generates HV. Therefore, the high voltage is the peak detected sum of the HV winding voltage and the HV regulator winding voltage. The XRP voltage is not proportional to the HV in this configuration, but is proportional only to the portion of the HV that is generated by the HV transformer. If the isoexposure curves are high enough, such as in certain projection televisions, a large pad can be added to compensate for whatever the HV regulator may boost. Most direct view chassis do not have the luxury of sufficient voltage to allow for this pad between the nominal operating HV and the HV where X-radiation is emitted.

SUMMARY OF THE INVENTION

An overvoltage protection system according to the inventive arrangements taught herein results in a feedback voltage which is directly proportional to HV when a HV boost regulator is being used. The high voltage is therefor closely tracked, which in turn enables the operating curve to be much closer to the isoexposure curve without risking generation of X-radiation or causing frequent interruptions in operation of the television.

In such an overvoltage protection system, a first resonant retrace circuit is operable for generating a first voltage signal and a second resonant retrace circuit coupled to the first resonant retrace circuit is operable for generating a second voltage signal summed with the first voltage signal. An auxiliary winding of a flyback transformer in the first resonant retrace circuit generates a first feedback signal representative of the first voltage signal. A regulator senses the summed first and second voltage signals and generates a second feedback signal representative of the summed first and second voltage signals. The second resonant retrace means is responsive to the regulator. A resistive summing junction combines the first and second feedback signals to generate a composite feedback signal. An overvoltage protection circuit is responsive to the composite feedback signal for disabling operation of at least one of the first and second resonant retrace circuits.

DETAILED DESCRIPTION OF THE PREFERRED EMBODIMENTS

Figure 1:
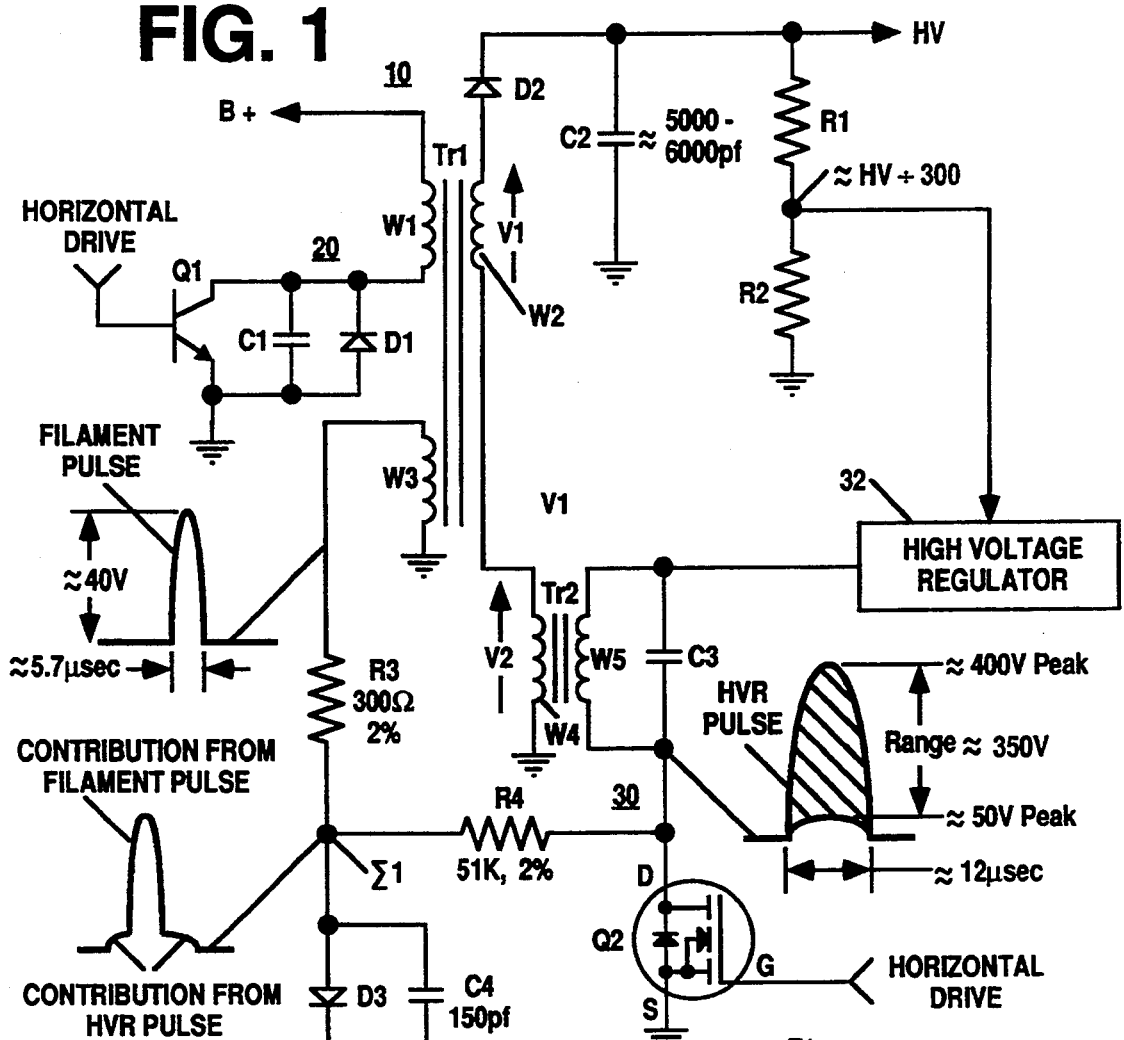
FIG. 1 is a schematic diagram of an overvoltage protection system for a television.

An overvoltage protection system 10 comprising a circuit for generating an ultor voltage, or high voltage, HV and an X-radiation protection circuit is shown in FIG. 1. A first resonant retrace circuit 20, for implementing horizontal deflection, comprises a source of horizontal drive signals (not shown), a horizontal output transistor Q1, a retrace capacitor C1, a damper diode D1 and a flyback transformer Tr1. Transformer Tr1 has a winding W1 connected to transistor Q1, capacitor C1 and diode D1 for generating the B+ voltage. A first voltage signal V1 is induced in winding W2, which forms part of the high voltage generating circuit. The first voltage signal is approximately 29.5 KV, in accordance with the isoexposure graph shown in FIG. 3. An auxiliary winding W3 generates a filament pulse which has an amplitude, or energy level, proportional to the voltage induced in winding W2. The filament pulse is a first feedback pulse, or signal, which is supplied to summing junction Σ1 through resistor R3.

A boost voltage circuit 30 comprises a second transformer Tr2, a second transistor Q2 switched by a horizontal drive signal, and a flyback capacitor C3 in parallel with winding W5 of transformer Tr2. A second voltage signal V2 is induced in winding W4 of transformer Tr2, which is connected in series with winding W2 and a diode D2, representative of an ultor voltage generating diode set. The second voltage signal is approximately 2.5 KV. The first and second voltage signals are summed by the series connected windings and develop a high voltage signal HV at capacitor C2. Capacitor C2 represents a combination of the kine capacitance and the capacitance of the high voltage splitter. A voltage divider formed by resistors R1 and R2 provides a feedback signal to a high voltage regulator 32, which may be embodied as a series pass regulator. The voltage divider provides a reduction factor of approximately 1/300.

Figure 2:
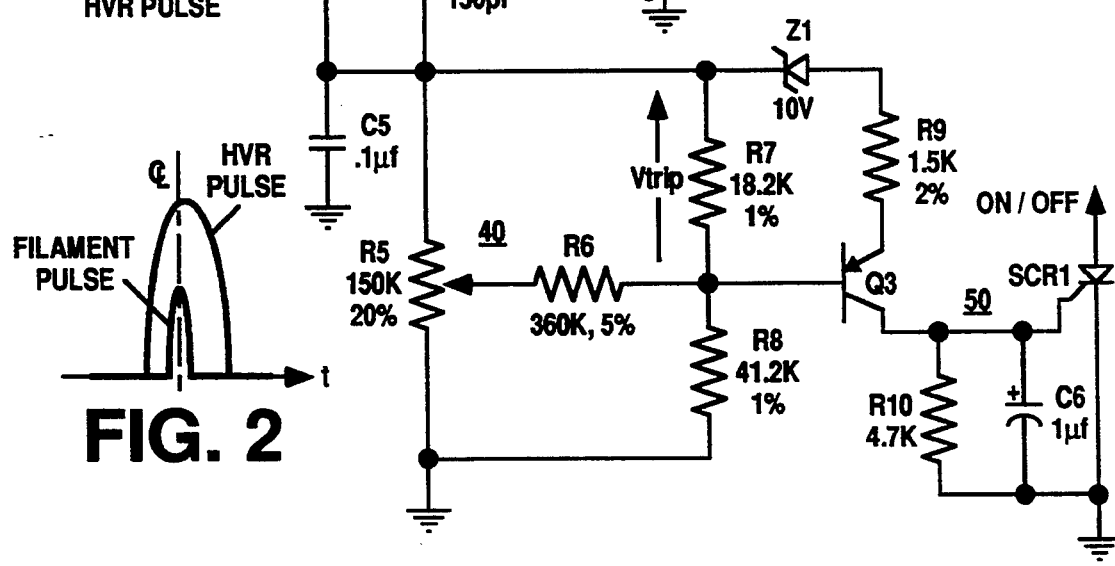
FIG. 2 is a timing diagram illustrating the relative phase of filament and HVR pulses generated in the circuit of FIG. 1.

The boost voltage is regulated by having the drain of transistor Q2 switch the resonant circuit formed by winding W5 and capacitor C3 creating the high voltage regulating (HVR) pulse. The HVR pulse will range between approximately 50 V peak and 400 V peak, depending upon the operation of the regulator 32. The HVR pulse is also supplied to summing junction Σ1 as a second feedback pulse, through resistor R4. As illustrated, the filament pulse is narrower than the HVR pulse, and will have a lower amplitude under normal conditions. The summing junction Σ1 produces a combination feedback pulse having contributions of both inputs to the summing junction. It can be seen that the combination feedback pulse is not symmetric. As shown in FIG. 2, the filament pulse occurs earlier in time. This results from diode D2 initiating conduction approximately at the trailing edge (right edge in the FIGURE) of the filament pulse.

With reference again to FIG. 1, an overvoltage protection circuit comprises a voltage sensing circuit 40 and a trip circuit 50. The distinction between circuits 40 and 50 is somewhat arbitrary, and made for convenience in description. Successive combination feedback pulses are rectified by diode D3 and develop a voltage level across capacitor C5. A filter capacitor C4 is in parallel with diode D3. Resistors R5, which is adjustable, R6, R7 and R8 determine the bias level at the base of transistor Q3. The voltage level is coupled to the emitter of transistor Q3 through Zener diode Z1 and resistor R9, when Zener diode Z1 is biased for reverse conduction. Zener diode Z1 is rated for 10 volts. Transistor Q3 will conduct when the emitter to base voltage exceeds approximately 0.7 volts. This will occur when the voltage Vtrip across resistor R7 exceeds approximately 10.7 volts. This can be set rather precisely by adjustment of resistor R5.

Trip circuit 50 includes a silicon controlled rectifier SCR1, which is normally nonconductive. The anode of SCR1 is normally high, in the logic sense. Conduction of transistor Q3 charges capacitor C6. When the voltage across capacitor C6 is high enough, SCR1 will be gated into conduction. The anode of SCR1 will be pulled to ground. The anode of SCR1 therefor provides an ON/OFF signal for X-radiation protection. The control signal can be used for disabling the power supply and/or the horizontal deflection circuit and/or the boost circuit and/or as a command signal to a microprocessor, which would in turn disable some or all of the television circuitry to prevent generation of X-radiation.

Figure 3:
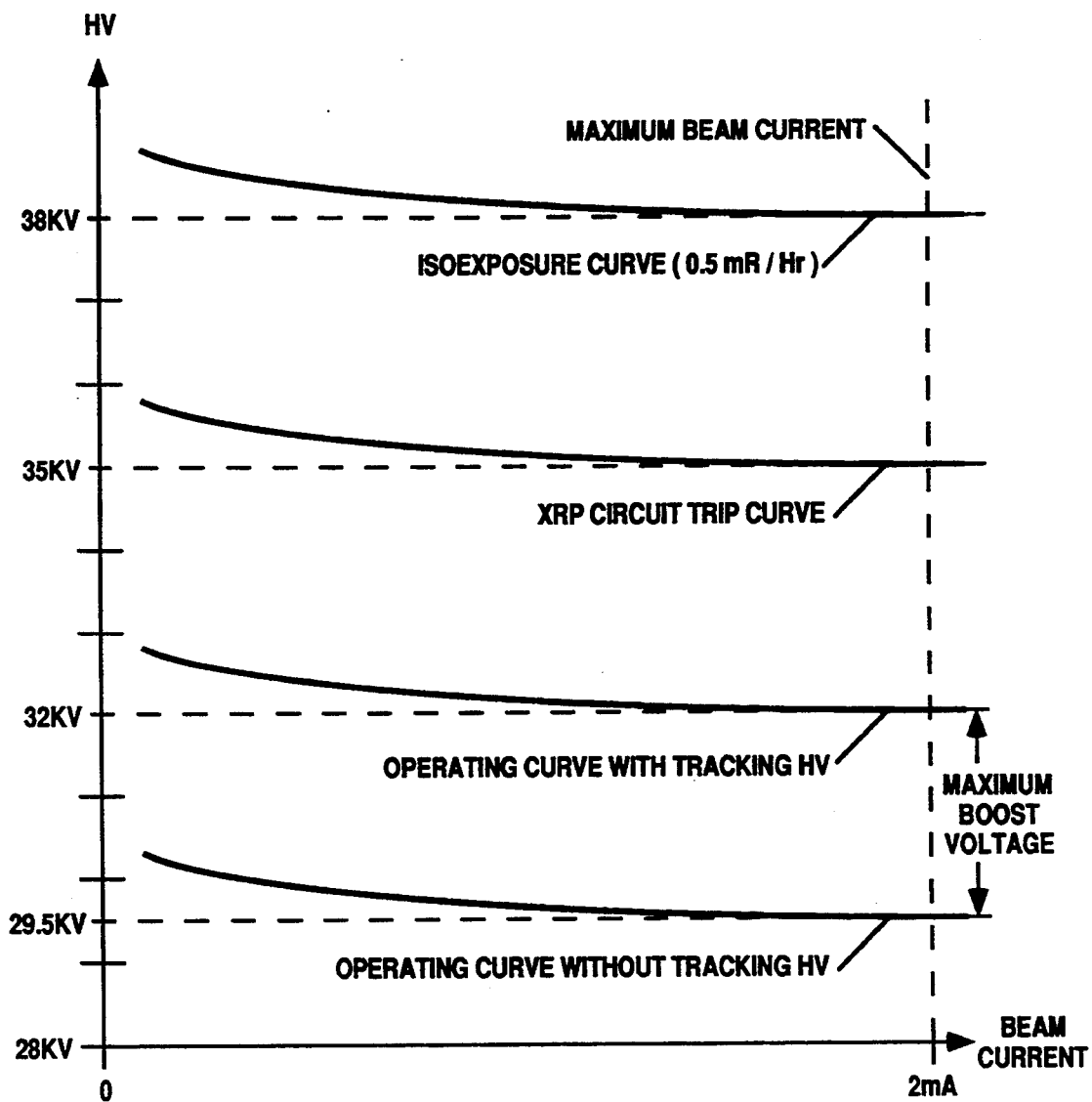
FIG. 3 is an isoexposure graph useful for explaining inventive arrangements.

Tracking the high voltage and combining the two feedback pulse signals for defining the trip voltage Vtrip each contribute to defining an operating curve which is much closer to the isoexposure curve than would be possible with known circuits, as shown in FIG. 3, without sacrificing safety. Moreover, the tolerances of only a small number of resistors are important for precise control. Resistors R7, R8 and R9 have a 1% tolerance and resistors R3 and R4 have a 2% tolerance. This reduces the cost of the overvoltage protection circuit and contributes to the need for a smaller pad between the operating curve and the isoexposure curve.

What is claimed is:

1. An overvoltage protection system for a television apparatus, comprising:
    first resonant retrace means including a first flyback transformer and operable for generating a first voltage signal;
    second resonant retrace means including a second flyback transformer, coupled to said first resonant retrace means and operable for generating a second voltage signal summed with said first voltage signal;
    means for generating a first feedback signal representative of said first voltage signal;

means for generating a second feedback signal representative of said summed first and second voltage signals;

means for combining said first and second feedback signals to generate a composite feedback signal; and, an overvoltage protection circuit responsive to said composite feedback signal for disabling operation of at least one of said first and second resonant retrace means.

2. The system of claim 1, wherein said means for generating said second feedback signal comprises a circuit for sensing said summed first and second voltage signals, said second resonant retrace means being responsive to said sensing circuit.

3. The system of claim 1, wherein said summed first and second voltage signals are a high voltage signal and said overvoltage protection circuit is an X-radiation protection circuit.

4. The system of claim 1, wherein said means for generating said first feedback signal comprises a winding of said first flyback transformer.

5. The system of claim 1, wherein said second flyback transformer has a winding coupled between a source of supply voltage representative of said summed first and second voltages and a switching circuit.

6. The system of claim 1, wherein:

said first flyback transformer has a primary winding coupled between a first source of supply voltage and a first switching circuit, a secondary winding for generating said first voltage signal and an auxiliary winding for generating said first feedback signal; and, said second flyback transformer has a primary winding coupled between a second source of supply voltage, representative of said summed first and second voltages, and a second switching circuit and a secondary winding for generating said second voltage signal coupled to said secondary winding of said first flyback transformer, said second feedback signal being the voltage across said second switching means.

7. The system of claim 1, wherein said combining means comprises a resistive summing junction.

8. An overvoltage protection system for a television apparatus, comprising:

first and second flyback transformers, having respective windings coupled in series for generating a high voltage signal defined by a sum of first and second voltage signals respectively induced in said respective windings;

a second winding of said first flyback transformer for successively generating first feedback pulses, indicative of said first voltage signal;

a regulating circuit responsive to said high voltage signal and successively generating second feedback pulses, indicative of said high voltage signal;

means for combining said first and second feedback pulses to define successive composite feedback pulses;

means for generating a continuous signal indicative of energy in said composite feedback pulses; and, means for sensing said continuous signal and generating a control signal for initiating operation of an overvoltage protection circuit.

9. The system of claim 8, wherein each of said transformers forms part of a resonant retrace circuit.

10. The system of claim 9, wherein one of said resonant retrace circuits is controlled by said regulating means.

11. The system of claim 8, wherein said continuous signal is a voltage level signal.

12. An overvoltage protection system for a television apparatus, comprising:

a first flyback transformer operable for generating a first voltage signal;

a second flyback transformer coupled to said first flyback transformer and operable for generating a second voltage signal summed with said first voltage signal;

means for generating a first feedback signal representative of said first voltage signal;

means for generating a second feedback signal representative of said summed first and second voltage signals;

means for combining said first and second feedback signals to generate a composite feedback signal; and, an overvoltage protection circuit responsive to said composite feedback signal for disabling operation of at least one of said first and second flyback transformers.

13. The system of claim 12, wherein said means for generating said second feedback signal comprises a circuit for sensing said summed first and second voltage signals, operation of said second flyback transformer being responsive to said sensing circuit.

14. The system of claim 12, wherein said summed first and second voltage signals are a high voltage signal and said overvoltage protection circuit is an X-radiation protection circuit.

15. The system of claim 12, wherein said means for generating said first feedback signal comprises a winding of said first flyback transformer.

16. The system of claim 12, wherein said second flyback transformer has a winding coupled between a source of supply voltage representative of said summed first and second voltages and a switching circuit.

17. The system of claim 12, wherein:

said first flyback transformer has a primary winding coupled between a first source of supply voltage and a first switching circuit, a secondary winding for generating said first voltage signal and an auxiliary winding for generating said first feedback signal; and, said second flyback transformer has a primary winding coupled between a second source of supply voltage, representative of said summed first and second voltages, and a second switching circuit and a secondary winding for generating said second voltage signal coupled to said secondary winding of said first flyback transformer, said second feedback signal being the voltage across said second switching means.

18. The system of claim 12, wherein said combining means comprises a resistive summing junction.

19. An overvoltage protection system for a television apparatus, comprising:

resonant retrace means including a first flyback transformer and operable for generating a first voltage signal;

a switching circuit;

a second flyback transformer having a winding coupled between a source of supply voltage and said switching circuit, for generating a second voltage signal summed with said first voltage signal, said supply voltage being representative of said summed first and second voltages;

means for generating a first feedback signal representative of said first voltage signal;

means for generating a second feedback signal representative of said summed first and second voltage signals;

means for combining said first and second feedback signals to generate a composite feedback signal; and, an overvoltage protection circuit responsive to said composite feedback signal for disabling operation of at least one of said resonant retrace means and said switching circuit.

* * * * *